(12) United States Patent
Cho et al.

(10) Patent No.: US 12,210,374 B2
(45) Date of Patent: Jan. 28, 2025

(54) DISPLAY DEVICE

(71) Applicant: LG Display Co., Ltd., Seoul (KR)

(72) Inventors: SeokHyo Cho, Paju-si (KR); Doohee Cho, Seoul (KR); DoYoung Song, Seoul (KR); Nakyoung Han, Paju-si (KR); Sangyong Park, Incheon (KR)

(73) Assignee: LG Display Co., Ltd., Seoul (KR)

( * ) Notice: Subject to any disclaimer, the term of this patent is extended or adjusted under 35 U.S.C. 154(b) by 301 days.

(21) Appl. No.: 17/956,662

(22) Filed: Sep. 29, 2022

(65) Prior Publication Data

US 2023/0176618 A1 Jun. 8, 2023

(30) Foreign Application Priority Data

Dec. 2, 2021 (KR) .......................... 10-2021-0170686

(51) Int. Cl.
*G06F 1/16* (2006.01)
*G02F 1/1333* (2006.01)

(52) U.S. Cl.
CPC ...... *G06F 1/1601* (2013.01); *G02F 1/133308* (2013.01); *G06F 1/1624* (2013.01); *G06F 1/1647* (2013.01); *G06F 1/1656* (2013.01)

(58) Field of Classification Search
CPC ............. G02F 1/13334; G02F 1/13471; G02F 1/133308; G06F 1/1601
See application file for complete search history.

(56) References Cited

U.S. PATENT DOCUMENTS

| 6,481,851 B1* | 11/2002 | McNelley | ............... | G03B 15/10 |
| | | | | 359/488.01 |
| 9,791,943 B2* | 10/2017 | Hulford | ................ | G06F 1/1643 |
| 11,632,890 B2* | 4/2023 | Cho | ..................... | H10K 59/121 |
| | | | | 257/40 |
| 2008/0084395 A1* | 4/2008 | Dawson | ................ | G06F 1/1637 |
| | | | | 345/168 |
| 2012/0105428 A1* | 5/2012 | Fleck | .................... | G06F 3/1431 |
| | | | | 345/419 |
| 2023/0209747 A1* | 6/2023 | Jeon | ..................... | H05K 5/0217 |

FOREIGN PATENT DOCUMENTS

| KR | 20190048029 A | * | 5/2019 |
| KR | 102252766 B1 | * | 12/2020 |
| KR | 102252777 B1 | * | 5/2021 |

\* cited by examiner

*Primary Examiner* — Nidhi Thaker
(74) *Attorney, Agent, or Firm* — Fenwick & West LLP

(57) ABSTRACT

Embodiments of the present disclosure provide a display device including a transparent display panel, a housing in which the transparent display panel is disposed, a rotating opening/closing member having a first end and a second end rotatably coupled to the housing to open and close the rear of the housing, a driving member mounted on the housing to rotate the rotating opening/closing member, and a connecting member connected to the second end of the rotating opening/closing member and transmitting the rotational force of the driving member to the rotating opening/closing member.

20 Claims, 16 Drawing Sheets

DISPLAY DEVICE

CROSS REFERENCE TO RELATED APPLICATION

This application claims priority from Republic of Korea Patent Application No. 10-2021-0170686, filed on Dec. 2, 2021, which is hereby incorporated by reference in its entirety.

TECHNICAL FIELD

Embodiments of the present disclosure relate to a display device.

DESCRIPTION OF RELATED ART

In general, flat panel displays such as a plasma display panel (PDP), a liquid crystal display panel (LCD), an organic light emitting diode display panel (OLED), etc. are mainly used.

A recent organic light emitting display panel has a cathode and an anode as transparent electrodes, and each pixel is composed of an organic light emitting diode, a pixel circuit driving the organic light emitting diode, a transparent part, and the like, and, by emitting light from both sides of the display panel, it can be applied as a transparent display capable of displaying information on both sides of the display panel.

However, such a transparent display device displays information to the user, and at the same time, the background of the display panel is transparent so that the user can recognize it, and transmits light from the background to the front. Due to this, there was a problem in that the user cannot select the general viewing mode and only the double-sided viewing mode is possible.

In particular, in the double-sided viewing mode, light is transmitted through both the front and rear sides of the transparent display panel, so an immersion feeling is reduced, making it difficult to develop various and innovative display devices required by consumers.

Therefore, there is a need for research to solve the above problems and to provide a display device capable of realizing more diverse viewing modes to users by allowing the user to change the normal viewing mode and the double-sided viewing mode.

SUMMARY

Embodiments of the present disclosure provide a display device in which a user can arbitrarily change to a normal viewing mode or a double-sided viewing mode in the display device.

Further, embodiments of the present disclosure provide a display device capable of increasing marketability by increasing the sense of unity and immersion of the entire display device when the general viewing mode or the double-sided viewing mode is changed in the display device.

The objects of the embodiments of the present disclosure are not limited to what have been described above, and those skilled in the art will clearly understand other objects not mentioned herein from the following description.

In one embodiment, a display device comprises: a transparent display panel; a housing comprising an upper frame at an upper end of the housing, a lower frame at a lower end of the housing, and a side frame connecting the upper frame to the lower frame, wherein the transparent display panel is disposed in the housing; a rotating opening/closing member comprising a first end that is rotatably coupled to the upper end of the housing and a second end that is opposite the first end and is rotatably coupled to the lower frame of the housing, the rotating opening/closing member configured to rotate between a first orientation to open a rear of the housing and a second orientation to close the rear of the housing; a driving member mounted on the lower frame, the driving member configured to rotate the rotating opening/closing member between the first orientation and the second orientation; and a connecting member connected to the second end of the rotating opening/closing member and comprising a connecting gear, the connecting gear coupled to the driving member and configured to transmit rotational force of the driving member to the rotating opening/closing member.

In one embodiment, a display device comprises: a transparent display panel; a housing in which the transparent display panel is disposed, the housing having a front surface and a rear surface that is opposite the front surface; and a rotating opening/closing member at the rear surface of the housing, the rotating opening/closing member configured to rotate between a first orientation and a second orientation, wherein in a first mode of the display device the rotating opening/closing member is in the first orientation that closes the rear surface of the housing such that the transparent display panel is viewable from the front surface but not the rear surface of the housing, and in a second mode of the display panel the rotating opening/closing member is in the second orientation that opens the rear surface of the housing such that the transparent display panel is viewable from both the front surface and the rear surface of the housing.

According to embodiments of the present disclosure, there may be provided a display device in which a user can arbitrarily change to a normal viewing mode or a double-sided viewing mode in the display device.

According to embodiments of the present disclosure, there may be provided a display device capable of increasing marketability by increasing the sense of unity and immersion of the entire display device when the normal viewing mode or the double-sided viewing mode is changed in the display device.

DETAILED DESCRIPTION

Figure 1:
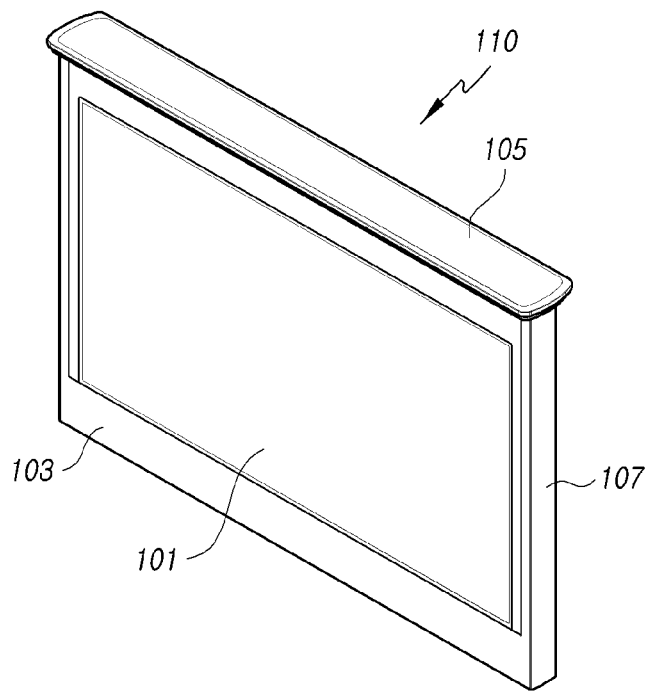
FIGS. 1 and 2 are perspective views illustrating a front and rear of the display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
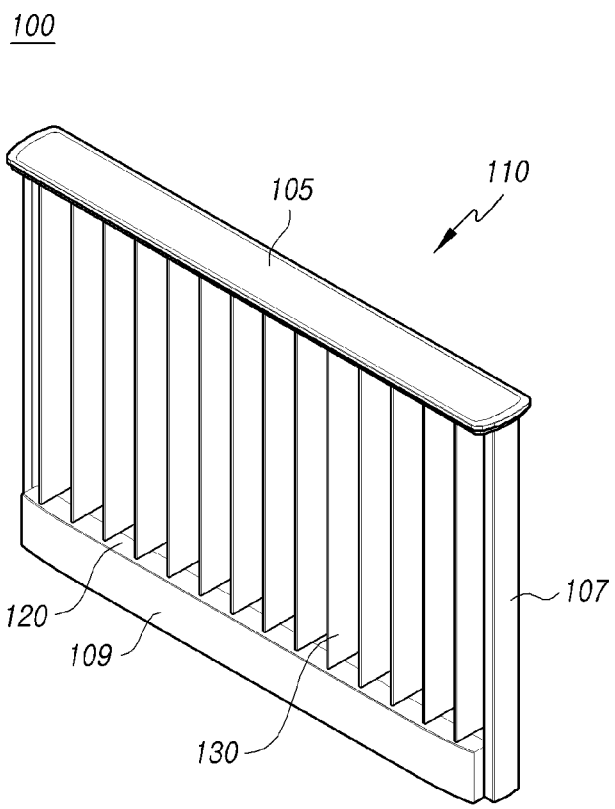
Figure 3:
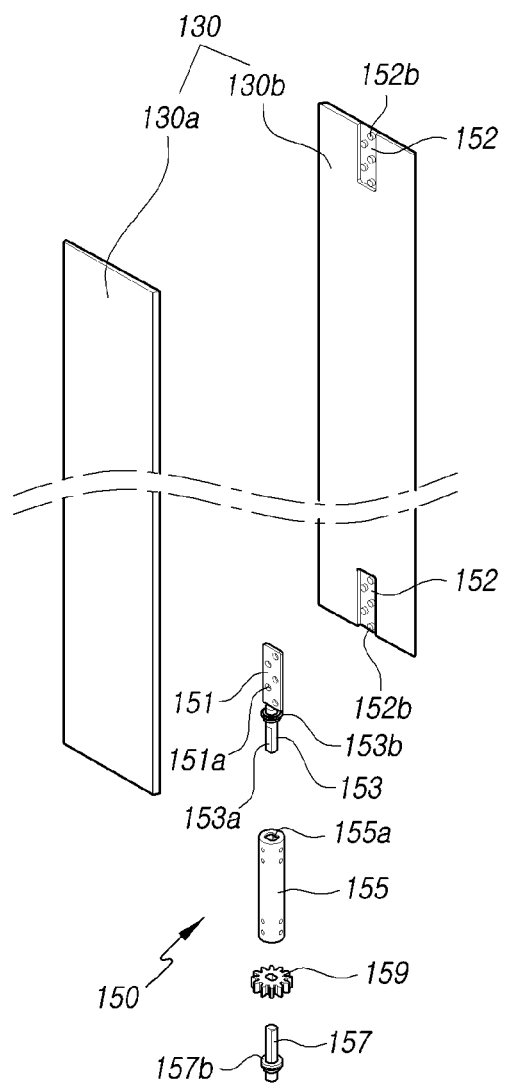
FIG. 3 is an exploded perspective view illustrating a rotating opening/closing member and a connecting member of the display device according to embodiments of the present disclosure.
Figure 4:
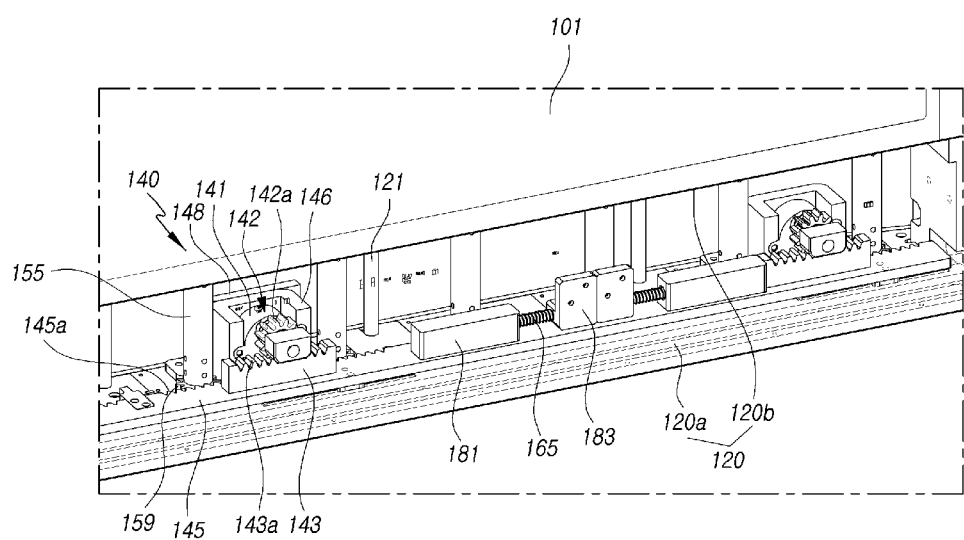
FIGS. 4 to 7 are perspective views illustrating the display device according to embodiments of the present disclosure.
Figure 8:
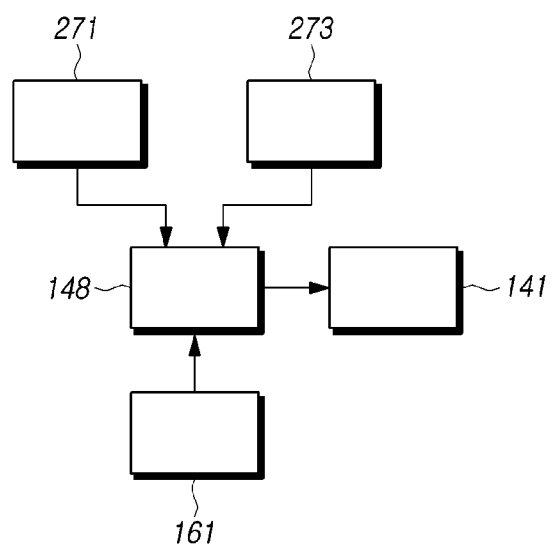
FIG. 8 is a block diagram illustrating a display device according to embodiments of the present disclosure.
Figure 9:
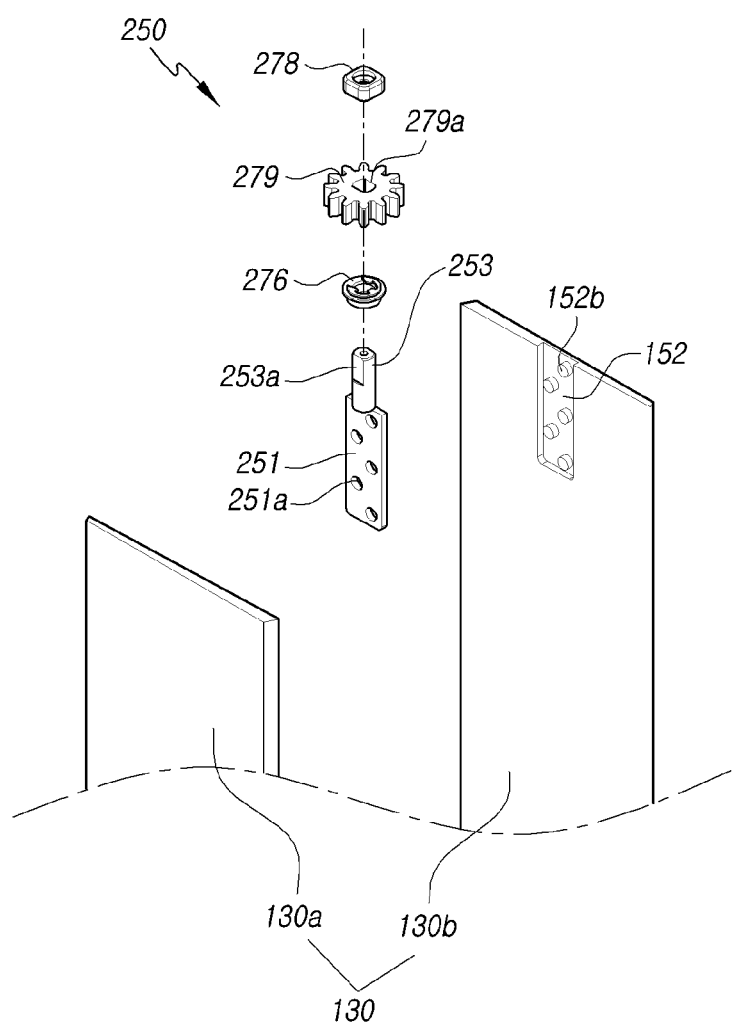
FIGS. 9 to 11 are perspective views illustrating a display device according to embodiments of the present disclosure.
Figure 10:
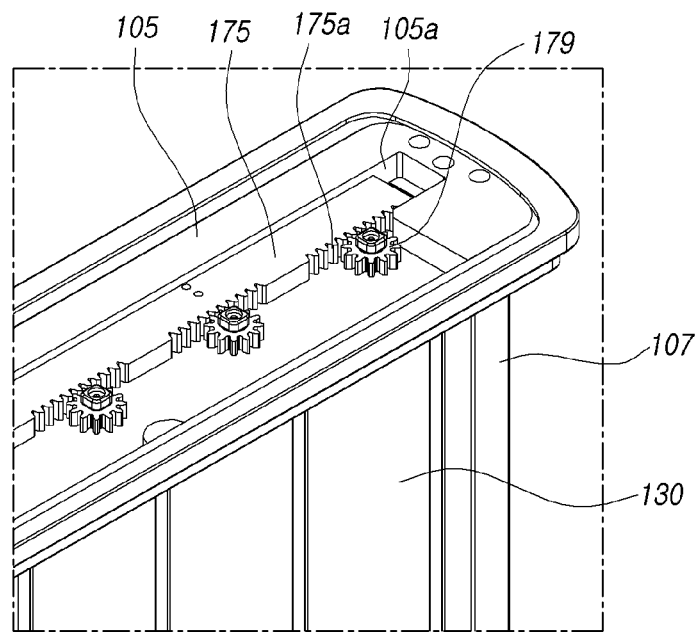
Figure 11:
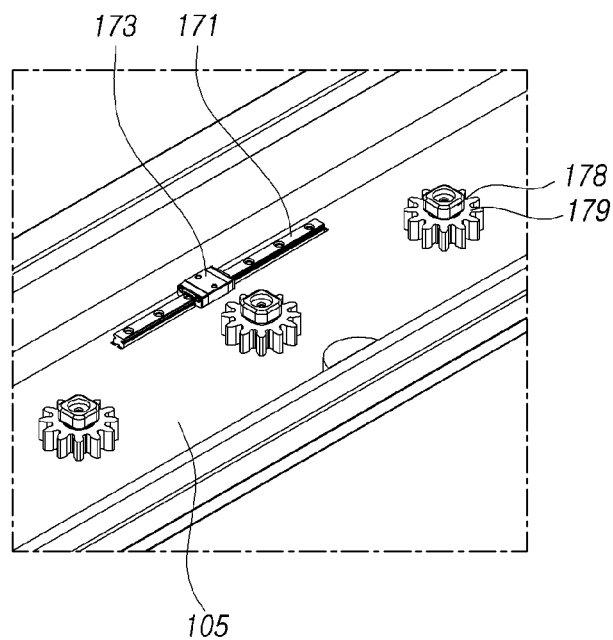
Figure 12:
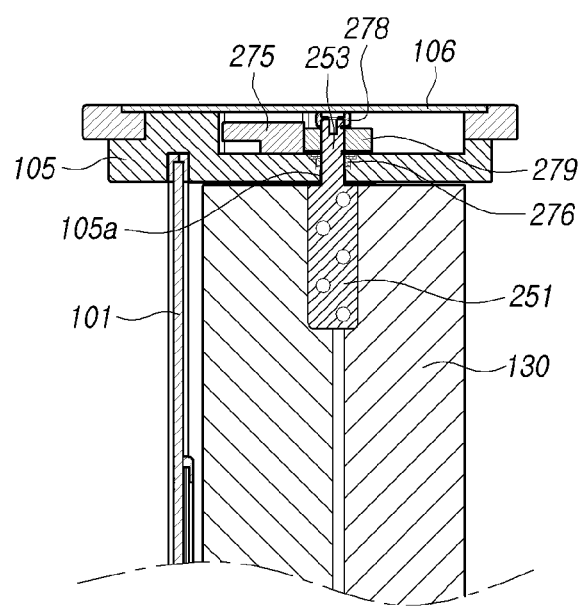
FIG. 12 is a sectional view illustrating a display device according to embodiments of the present disclosure.
Figure 13:
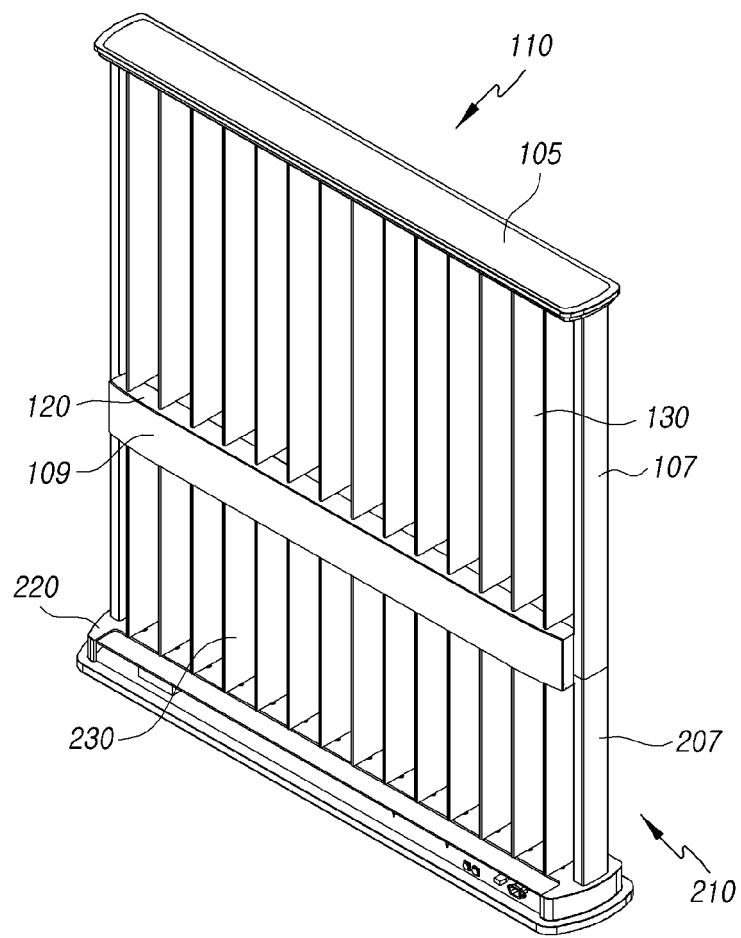
FIGS. 13 and 14 are perspective views illustrating a display device according to embodiments of the present disclosure.
Figure 14:
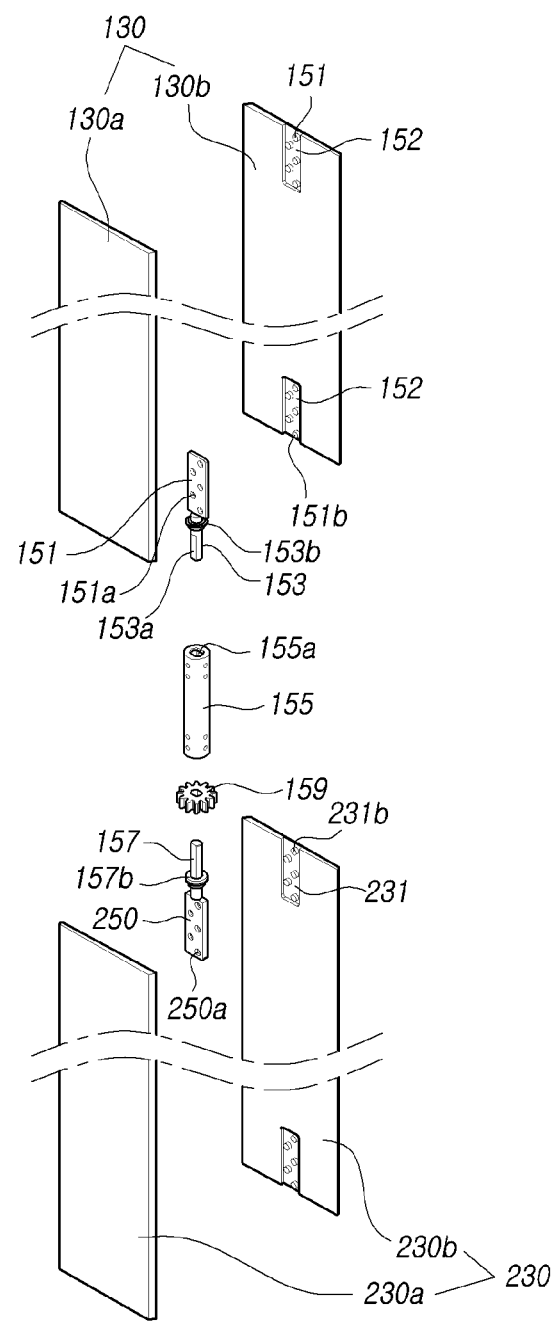
Figure 15:
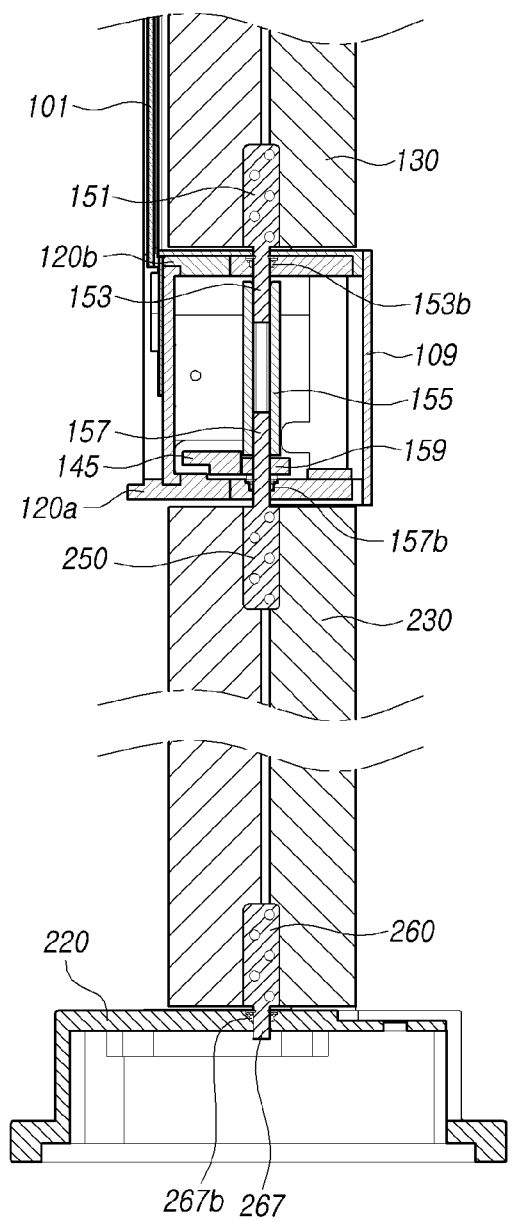
FIG. 15 is a sectional view illustrating a display device according to embodiments of the present disclosure.
Figure 16:
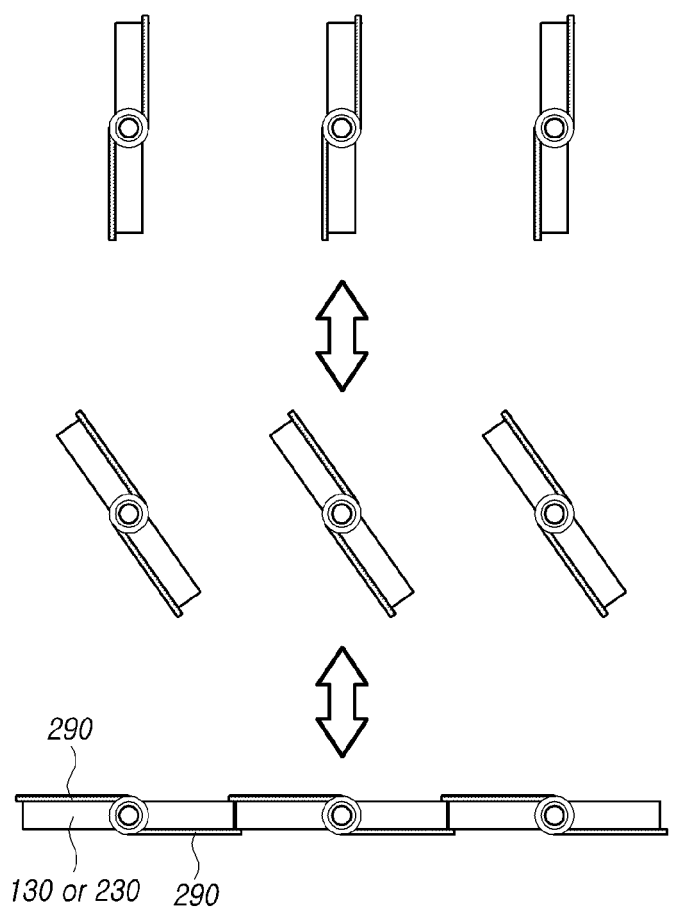
FIG. 16 is a plan view illustrating operation of a display device according to embodiments of the present disclosure.

FIGS. 1 and 2 are perspective views illustrating a front and rear of the display device according to embodiments of the present disclosure. FIG. 3 is an exploded perspective view illustrating a display device according to embodiments of the present disclosure. FIGS. 4 to 7 are perspective views illustrating a display device according to embodiments of the present disclosure. FIG. 8 is a block diagram illustrating a display device according to embodiments of the present disclosure. FIGS. 9 to 11 are perspective views illustrating a display device according to embodiments of the present disclosure. FIG. 12 is a sectional view illustrating a display device according to embodiments of the present disclosure. FIGS. 13 and 14 are perspective views illustrating a display device according to embodiments of the present disclosure. FIG. 15 is a sectional view illustrating a display device according to embodiments of the present disclosure. FIG. 16 is a plan view illustrating operation of a display device according to embodiments of the present disclosure.

As illustrated in FIGS. 1 to 16, a display device according to embodiments of the present disclosure may include a transparent display panel 101, a housing 110 including an upper frame 105 and a lower frame 120 respectively disposed at an upper end and lower end of the housing 110, and a side frame 107 connecting both ends of the upper frame 105 and the lower frame 120, in which the transparent display panel 101 is accommodated (e.g., disposed), a rotating opening/closing member 130 having one end and the other end rotatably coupled to the upper frame 105 and the lower frame 120 of the housing 110 to open and close a rear of the housing 110, a driving member 140 mounted on the lower frame 120 to rotate the rotating opening/closing member 130, and a connecting member 150 connected to one end of the rotating opening/closing member 130. The connecting member 150 comprises a connecting gear 159 coupled to the driving member 140 to transmit the rotational force of the driving member 140.

The transparent display panel 101 in the embodiments of the present disclosure may be applied regardless of whether it is a liquid crystal display panel or an organic light emitting display panel.

That is, when the transparent display panel 101 is configured as an LCD panel, the transparent display panel may further include a backlight unit irradiating light onto the LCD panel, a lower polarization plate attached to a lower substrate, and an upper polarization plate attached to the front surface of an upper substrate. The specific configurations of the lower substrate and the upper substrate may be formed in various manners known to those skilled in the art according to, for example, twisted nematic (TN) mode, vertical alignment (VA) mode, in plane switching (IPS) mode, and fringe field switching (FFS) mode.

When the transparent display panel 101 is configured as a light emitting display panel, the light emitting display panel may include a lower substrate in which a plurality of light emitting cells are formed in respective areas defined by gate lines, data lines, and power (VDD) lines, and an upper substrate face to face bonded to the lower substrate. This configuration is well known in the art to which the present disclosure is relevant, and thus related drawings and detailed description are not provided herein.

As such, the transparent display panel 101 may be used irrespective of its type in embodiments of the present disclosure. Accordingly, the following description is given irrespective of the type of a display panel.

The housing 110 in which the transparent display panel 101 is accommodated includes the upper frame 105 and the lower frame 120 respectively disposed on the upper and lower sides of the housing 110, and the side frame 107 connecting both ends of the upper frame 105 and the lower frame 120 as previously described above. Furthermore, a front cover 103 surrounding the edge of the transparent display panel 101 is coupled to the front surface of the housing 110.

Here, the lower frame 120 disposed at the lower end of the housing 110 includes an upper horizontal frame 120b and a lower horizontal frame 120a facing each other, and the driving member 140 to be described later is mounted between the upper horizontal frame 120b and the lower horizontal frame 120a. A rear cover 109 is coupled to the rear side of the lower frame 120.

In addition, a rotating opening/closing member 130 is provided in the upper frame 105 and the lower frame 120 to open and close the rear of the housing 110 according to the user's display purpose.

The rotating opening/closing member 130 has a first end and a second end that is opposite the first end and is respectively rotatably coupled to the upper frame 105 and the lower frame 120. The rotating opening/closing member 130 is rotated by the driving member 140 mounted on the lower frame 120. In one embodiment, the rotating opening/closing member 130 can be rotated between a first orientation and a second orientation.

Accordingly, the user can use both the normal viewing mode (e.g., a first mode) and the double-sided viewing mode (e.g., a second mode) depending on whether the rotation opening/closing member 130 is rotated in either the open or closed position. In one embodiment, in the normal viewing mode the rotating opening/closing member 130 is in the first orientation that closes a rear surface of the housing 110 such that the transparent display panel 101 is viewable from the front surface but not the rear surface of the housing 110, and in the double-sided viewing mode the rotating opening/closing member 130 is in the second orientation that opens the rear surface of the housing 110 such that the transparent display panel 101 is viewable from both the front surface and the rear surface of the housing 110.

Thus, the normal viewing mode refers to a case where one side of the display panel is viewed (e.g., the front side) and the other side (e.g., the rear side) of the display panel is not viewed, such as watching TV, and the double-sided viewing mode refers to a case where both the front and back sides of the display panel are viewed.

The connecting member 150 connected to one end of the rotating opening/closing member 130 is provided with a connecting gear 159 coupled to the driving member 140 so that when the driving member 140 is rotated, the rotational force of the driving member 140 is transmitted to the rotation opening/closing member 130.

The driving member 140 includes a driving motor 141 coupled to the lower horizontal frame 120a, a first gear 142 coupled to the driving motor 141 to rotate, and a sliding member 145 slid when the driving motor 141 rotates, and having a second gear 143 disposed parallel to the lower horizontal frame 120a and coupled to the first gear 142 is provided on an upper surface thereof, and having a third gear 145a coupled to the connecting gear 159 of the rotating opening/closing member 130 is provided on the side surface.

The driving motor 141 is coupled to the lower horizontal frame 120a by the motor bracket 146, and the motor bracket 146 is provided with a motor coupling part 146b to which the driving motor 141 is coupled. The motor bracket 146 is provided with a frame coupling part 146a that protrudes from the lower side of the motor coupling part 146b and is coupled to the lower horizontal frame 120a and is fixed with a fastening member.

Accordingly, when the first gear 142 rotates in one direction according to the rotation direction when the driving motor 141 is rotated, the second gear 143 provided with the second gear teeth 143a meshed with the first gear teeth 142a is made to slide in one direction of the lower horizontal frame 120a together with the sliding member 145.

A case in which the first gear 142 and the third gear 145a is a pinion gear and the second gear 143 is a rack gear is illustrated as an example, and the second gear 143 may be separately provided on the upper surface of the sliding member 145 or may be integrally formed.

Then, when the sliding member 145 slides, the third gear 145a rotates the connecting gear 159 to rotate the rotating opening/closing member 130.

The connecting member 150 for transmitting the rotational force of the driving member 140 to the rotating opening/closing member 130 includes a coupling portion 151 coupled to one end of the rotating opening/closing member 130 (e.g., the second end), a first support portion 153 connected to the coupling portion 151 and rotatably supported by the upper horizontal frame 120b, a body portion 155 having one end connected to the first support portion 153 and to which the connecting gear 159 is coupled, and a second support portion 157 connected to the other end of the body portion 155 and rotatably supported by the lower horizontal frame 120a.

The coupling portion 151 is provided with any one of a coupling protrusion 152b and a coupling hole 151a, and the coupling groove 152 of the rotating opening/closing member 130 is provided with the other one of a coupling protrusion and a coupling hole at a portion in contact with the coupling part 151. Therefore, the coupling protrusion and the defect hole are engaged with each other and are coupled.

That is, rotating opening/closing member 130 is formed of a pair 130a and 130b of vanes that are combined with each other. A coupling groove 152 is formed at one end of the rotary opening/closing member 130, and the coupling portion 151 coupled to the coupling recess 152 is formed in a plate shape to be inserted into the coupling recess 152, so that the coupling protrusion 152b and the coupling hole 151a are engaged with each other. In this embodiment, a case in which the coupling hole 151a is provided in the coupling part 151 and the coupling protrusion 152b is provided in the coupling groove 152 is illustrated as an example.

Accordingly, the bonding strength of the coupling part is increased without increasing the thickness of the rotating opening/closing member 130, so that deformation and damage do not occur when the rotational force of the driving member 140 is transmitted, and durability is improved.

The upper horizontal frame 120b and the lower horizontal frame 120a to which the connecting member 150 is coupled are provided with rotation support holes 127 and 124 to which the first support part 153 and the second support part 157 are coupled. Rotation support members 153b and 157b which are supported by rotation support holes 127 and 124 are provided on outer peripheral surfaces of the first support part 153 and the second support part 157.

Accordingly, when the rotational force of the driving member 140 is transmitted to the rotating opening/closing member 130, noise and vibration are reduced, and power may be accurately transmitted to the rotating opening/closing member 130 without loss of power.

The body portion 155 of the connection member 150 is provided with connection holes 155a in the longitudinal direction at both end portions, and is formed such that the first support portion 153 and the second support portion 157 are respectively connected to each other. Accordingly, the assembly of the connecting member 150 and the rotating opening/closing member 130 is facilitated, and the central axes of the first support portion 153 and the second support portion 157 are accurately maintained.

The upper horizontal frame 120b and the lower horizontal frame 120s respectively include a first frame 120b-1 and 120a-1 connected to the side frame 107 of the housing 110 and having an opening hole 125 disposed at one end to be spaced apart from each other in both directions, and a second frame 120*b*-2 and 120*a*-2 to which the connecting member 150 is rotatably coupled and coupled to the opening hole 125 of the first frame 120*b*-1 and 120*a*-1.

The opening hole 125 is formed so that one end of the first frame 120*b*-1 and 120*a*-1 is opened, so that the second frame 120*b*-2 and 120*a*-2 can be inserted therein, and stepped portions 123 stepping up and down are provided on both sides of the opening hole 125.

The second frame 120*b*-2 and 120*a*-2 is provided with an insertion portion 128 inserted into the opening hole 125 and an extension portion 126 that extends to both sides of the insertion portion 128 and is supported by the stepped portion 123 and coupled thereto. Therefore, while the insertion portion 128 of the second frame 120*b*-2 and 120*a*-2 is inserted into the opening hole 125 of the first frame, the extension portion 126 is seated on an upper surface of the stepped portion 123 and is coupled by a fastening member.

Accordingly, the second frame 120*b*-2 and 120*a*-2 in which the first support portion 153 and the second support portion 157 of the connecting member 150 are coupled to the rotation support holes 127 and 124 are slidably inserted into the first frame 120*b*-1 and 120*a*-1 and assembly can be made.

In addition, the upper horizontal frame 120*b* and the lower horizontal frame further include a post member 121 having both end portions coupled to opposite positions of the first frame 120*b*-1 and 120*a*-1 to vertically support the upper horizontal frame 120*b* and the lower horizontal frame 120*a*.

The post member 121 is vertically disposed on the first frames 120*b*-1 and 120*a*-1 and is fixed with a fastening member. Thus, the rigidity of the upper horizontal frame 120*b* and the lower horizontal frame 120*a* is increased.

Meanwhile, the driving member 140 may further include sensor assembly 161 and 163. The sensor assembly 161 and 163 include a first sensor 161 coupled to the lower horizontal frame 120*a* to sense a sliding position of the sliding member 145, and a second sensor 163 provided on the sliding member 145 and disposed adjacent to the first sensor 161.

Here, the first sensor 161 and the second sensor 163 are provided in plurality, and the spaced apart distance of the first sensor 161 is wider than the spaced apart distance of the second sensor 163.

Figure 5:
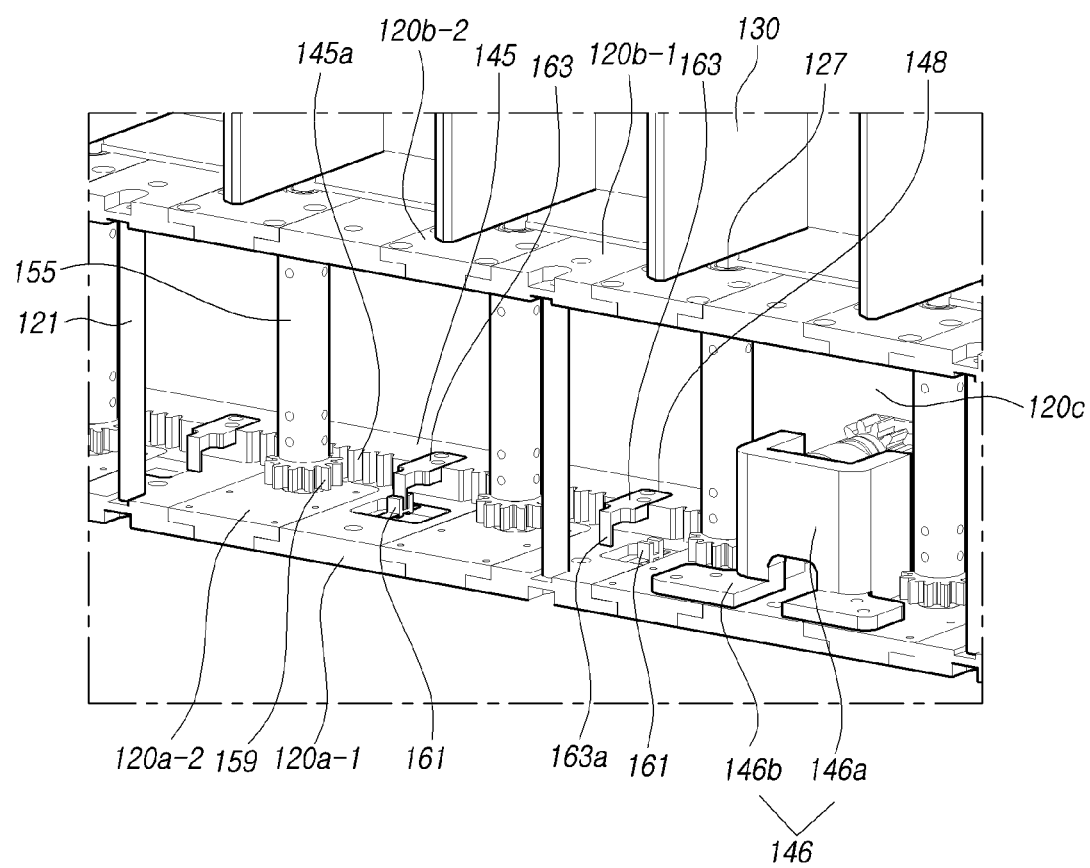
Figure 6:
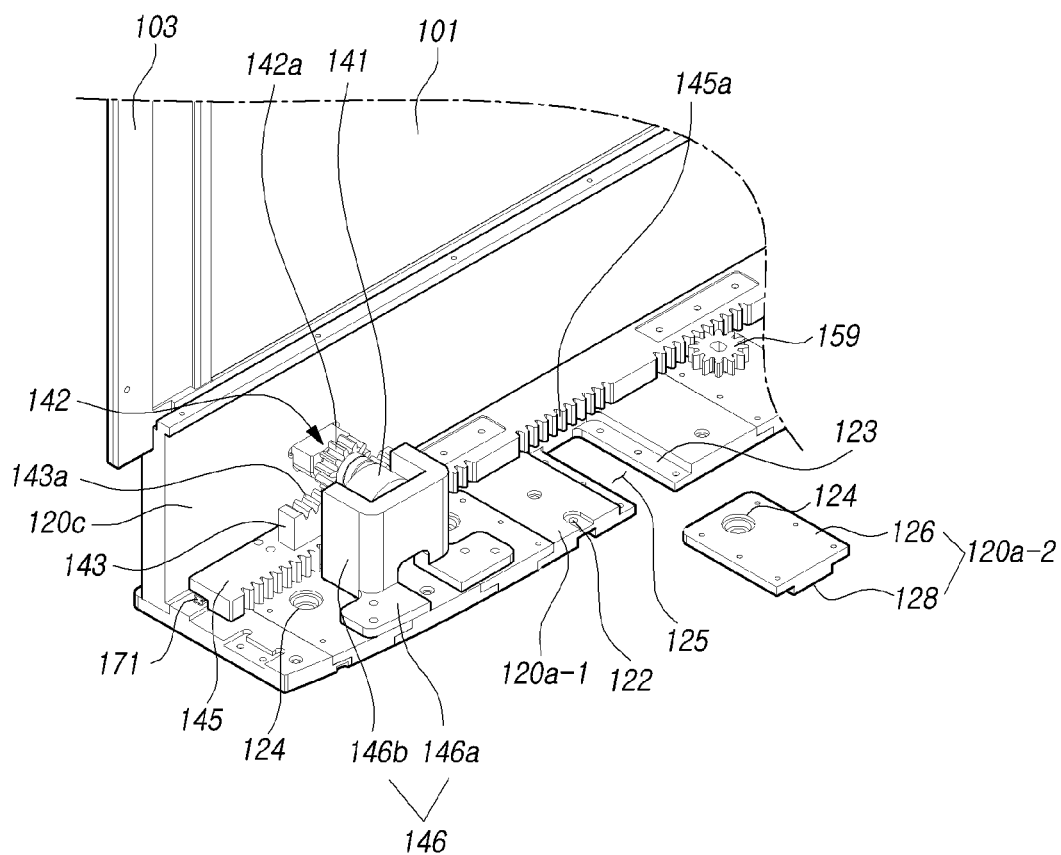
Figure 7:
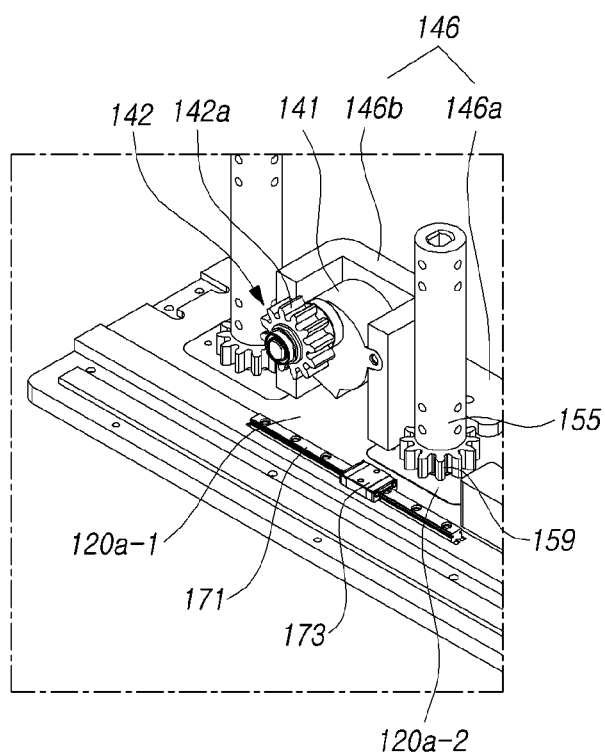

Accordingly, as shown in FIG. 5, based on the position where any one of the second sensor 163 is in contact with the first sensor 161 (in this case, the rotating opening/closing member is perpendicular to the transparent display panel), when the sliding member slides in the right direction in the drawing, the second sensor 163 in contact with the first sensor 161 is separated from the first sensor 161 to the right. And the position of the sliding member is sensed while the second sensor 163 adjacent to the right is in contact with the sequentially arranged the first sensor 161 (in this case, the rotating opening/closing member is parallel to the transparent display panel).

On the other hand, the driving member 140 may further include a controller 148 for controlling the operation of the driving motor 141. The controller 148 is electrically connected to the driving motor 141 and comparing a signal value received from a remote controller 271 or an opening/closing switch 273 with a signal value received from the first sensor 161 to control whether the driving motor 141 operates and the rotation direction to control the opening and closing of the rotating opening/closing member 130. The controller 148 may be implemented as an ECU or MCU, or may be implemented as a printed circuit board on which the ECU or MCU is mounted.

Here, the remote controller 148 is also electrically connected to the control board (not shown) electrically connected to the transparent display panel to control the image reproduction on the screen, and the opening/closing switch may be provided as a separate switch type in the housing. Since the technology is generally used in the technical field to which the present embodiments pertain, a detailed description thereof will be omitted.

Accordingly, the first gear 142, the second gear 143, and the third gear 145*a* are operated by the driving motor 141, and by sending the sliding position of the sliding member 145 to the controller 148, the rotation angle of the rotating opening/closing member 130 can be controlled.

The third gear 145*a* provided on the side of the sliding member 145 may comprise a plurality of gear portions on the side surface of the sliding member 145 and the gear portions are spaced apart from each other on the side surface of the sliding member 145. In one embodiment, a second sensor 163 is provided between a pair of gear portions of the third gear 145*a*. Therefore, when the sliding member 145 slides, the second sensor 163 does not interfere with the connecting gear 159.

The second sensor 163 is coupled to a coupling groove 148 provided in the sliding member 145 by a fastening member, and an extension portion 163*a* extending in the direction of the first sensor 161 is provided at one end of the second sensor 163.

Accordingly, when the sliding member 145 slides, the extension portion 163*a* of the second sensor 163 can move to a position closest to the first sensor 161 according to the sliding position, so that the sensing of the sliding position becomes more accurate and errors do not occur.

In addition, the driving member 140 further includes a first fixing member 181 coupled to the sliding member 145 and sliding together with the sliding member 145, a second fixing member 183 coupled to a vertical frame 120*c* disposed perpendicular to the lower horizontal frame 120*a* and disposed in both directions of the first fixing member 181, and an elastic member 165 provided between the first fixing member 181 and the second fixing member 183 to elastically support the first fixing member 181 and the second fixing member 183 in both directions.

That is, the first fixing member 181 is fixed to the upper surface of the sliding member 145, the second fixing member 183 is fixed to the vertical frame 120*c*, and the elastic member 165 is elastically supported therebetween.

Therefore, when the sliding member 145 slides, the first gear 142 and the second gear 143 and the third gear 145*a* reduces the gap between the gear teeth, so that the sliding position of the sliding member 145 is accurately implemented.

The first fixing member 181, the second fixing member 183, and the elastic member 165 may be provided with two or more pairs while forming one pair.

In addition, the lower horizontal frame 120*a* is provided with a guide rail 171 for guiding the sliding of the sliding member 145, and the sliding member 145 has a guide member 173 moving along the guide rail 171. Therefore separation of the sliding member is prevented when the sliding member 145 slides.

Meanwhile, as shown in FIG. 9, the embodiments of the present disclosure may further include an upper connecting member 250 connected to the other end of the rotating opening/closing member 130.

The upper connection member 250 includes an upper coupling portion 251 coupled to the other end of the rotating opening/closing member 130, an upper support portion 253 connected to the upper coupling portion 251 and rotatably supported by the upper frame 105, and an upper connection gear 279 coupled to the upper support portion 253.

Here, the upper coupling portion 251 is provided with any one of a coupling protrusion and a coupling hole, and the other one of the coupling protrusion and the coupling hole is provided in the coupling groove formed at the other end of the rotating opening/closing member 130 at a portion in contact with the upper coupling part 251 to engage and engage with each other.

A coupling groove 152 into which the upper coupling portion 251 is inserted is formed at the other end of the rotating opening/closing member 130 formed as a pair 130a and 130b combined with each other, and the upper coupling portion 251 is formed in the shape of a plate inserted into the coupling groove 152 so that the coupling protrusion 152b and the coupling hole 251a are engaged with each other. In this embodiment, the case in which the coupling hole 251a is provided in the upper coupling portion 251 and the coupling protrusion 152b is provided in the coupling groove 152 is illustrated as an example.

In addition, as shown in FIG. 10, the display device further includes an upper sliding member 175 disposed on the upper frame 105 and coupled to the upper connection gear 179 to slide and move when the rotating opening/closing member 130 rotates.

Here, on the side surface of the upper sliding member 175, a side gear 175a that meshes with the upper connection gear 179 is formed.

The upper frame 105 is provided with a guide rail 171 for guiding the sliding of the upper sliding member 175, and the upper sliding member 175 has a guide member 173 that moves along the guide rail 171, so that the separation of the upper sliding member 175 is prevented when the upper sliding member 175 slides.

Therefore, when the upper connection gear 179 rotates when the rotating opening/closing member 130 rotates, the upper sliding member 175 slides in both directions, and the rotational force applied to one end and the other end of the rotating opening/closing member 130 (that is, the rotational force applied to the upper and lower portions of the rotating opening/closing member 130) is balanced, so that the rotation of the rotating opening/closing member 130 is precisely made.

In addition, the outer peripheral surface of the upper support portion 253 may be provided with a rotation support member 276 that is supported by the support hole 105a of the upper frame 105.

And, an upper rotation support member 278 is provided at the end of the upper support portion 253 that is fixed to an upper cover 106 of the housing 110 and supports the rotation of the upper support portion 253.

The upper rotation support member 278 is formed of an elastic material and elastically supports between the upper cover 106 and the upper connection member 250, so that the upper connection member 250 rotates without being biased to either side.

Meanwhile, the embodiments of the present disclosure may further include a lower housing 210 disposed under the housing 110 as shown in FIGS. 13 to 15. The lower housing 210 is provided with a lower opening/closing member 230 for opening and closing the rear of the lower housing 210, and the lower opening/closing member 230 is rotatably coupled to a lower housing frame 220 having one end and the other end facing each other with the lower horizontal frame 120a, and is rotated in conjunction with the rotating opening/closing member 130 by the driving member 140.

The lower housing 210 may include a lower horizontal frame 120a, a lower housing frame 220 facing each other, and a side extension frame 207 connected to the side frame 107.

One end of the lower opening/closing member 230 for opening and closing the rear of the lower housing 210 is connected to the second support portion 157 of the connecting member 150, and the other end of the lower opening/closing member 230 is coupled to a housing frame coupling portion 260, and the lower opening/closing member 230 is rotatably coupled to the lower housing frame 220. Accordingly, the lower opening/closing member 230 is rotated in conjunction with the rotating opening/closing member 130 by the rotational force of the driving member 140.

In this case, a lower coupling portion 250 is formed on the lower side of the second support portion 157, and any one of a coupling protrusion 231b and a coupling hole 250a is provided in the lower coupling portion 250. The lower opening/closing member 230 is provided with the other one of the coupling protrusion 231b and the coupling hole 250a at a portion in contact with the lower coupling portion 250 so that they can be engaged with each other. Since this is the same shape as the above-described coupling portion, further description will be omitted.

In the embodiments of the present disclosure, a case in which the coupling hole 250a is provided in the lower coupling portion 250 and the coupling protrusion 231b is provided in the lower opening/closing member 230 is illustrated as an example.

In addition, the housing frame coupling portion 260 is coupled to the other end of the lower opening/closing member 230, and a rotation support member 267b is provided on the outer peripheral surface of the frame support portion 267 connected to the housing frame coupling portion 260. The rotation support member 267b is coupled and rotatably supported by the lower housing frame 220.

In this way, the lower housing 210 is provided in the lower portion of the housing 110, and the lower opening/closing member 230 for opening and closing the rear thereof rotates in conjunction with the rotating opening/closing member 130, so that the sense of unity and immersion of the entire display device can be increased to increase the commercial value when the user changes the normal viewing mode or the double-sided viewing mode.

In addition, if an image such as a landscape, a person, a photograph, etc. is provided on the rear surface of the rotating opening/closing member 130 and the lower opening/closing member 230, when the user turns off the display panel 101, the housing 110 and the lower housing 210 may implement a picture frame function, so that the user can use all of the normal viewing mode, the double-sided viewing mode, and the picture frame mode.

In addition, as shown in FIG. 16, an overlapping member 290 may be provided on one front side and the other rear side of the rotating opening/closing member 130 and the lower opening/closing member 230. So, it is possible to completely block the light penetrating toward the transparent display panel 101 when the rotating opening/closing member 130 and the lower opening/closing member 230 are rotated.

Accordingly, when the rotating opening/closing member 130 and the lower opening/closing member 230 are arranged in parallel, the overlapping member 290 overlaps the adjacent rotating opening/closing member 130 or the lower opening/closing member 230, and it is possible to completely block light penetrating toward the transparent display panel 101.

As described above, according to the embodiments of the present disclosure, it is possible to provide a display device in which a user can arbitrarily change to a normal viewing mode or a double-sided viewing mode in the display device.

In addition, according to embodiments of the present disclosure, there may be provided a display device capable of increasing marketability by increasing the sense of unity and immersion of the entire display device when the normal viewing mode or the double-sided viewing mode is changed in the display device.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device, comprising:
   a transparent display panel;
   a housing comprising an upper frame at an upper end of the housing, a lower frame at a lower end of the housing, and a side frame connecting the upper frame to the lower frame, wherein the transparent display panel is disposed in the housing;
   a rotating opening/closing member comprising a first end that is rotatably coupled to the upper end of the housing and a second end that is opposite the first end and is rotatably coupled to the lower frame of the housing, the rotating opening/closing member configured to rotate between a first orientation to open a rear of the housing and a second orientation to close the rear of the housing;
   a driving member mounted on the lower frame, the driving member configured to rotate the rotating opening/closing member between the first orientation and the second orientation; and
   a connecting member connected to the second end of the rotating opening/closing member and comprising a connecting gear, the connecting gear coupled to the driving member and configured to transmit rotational force of the driving member to the rotating opening/closing member.

2. The display device according to claim 1, wherein the lower frame comprises an upper horizontal frame and a lower horizontal frame that is opposite the upper horizontal frame, and the driving member comprises:
   a driving motor coupled to the lower horizontal frame, the driving motor configured to rotate;
   a first gear coupled to the driving motor, the first gear configured to rotate responsive to the driving motor rotating;
   a second gear disposed parallel to the lower horizontal frame and coupled to the first gear, the second gear configured to slide responsive to rotation of the driving motor and the first gear; and
   a sliding member coupled to the second gear, the sliding member configured to slid responsive to the second gear sliding, the sliding member comprising a third gear coupled to the connecting gear of the rotating opening/closing member, the third gear on a side surface of the sliding member;
   wherein the second gear is disposed on an upper surface of the sliding member.

3. The display device according to claim 2, wherein the connecting member comprising:
   a coupling portion coupled to the second end of the rotating opening/closing member;
   a first support portion connected to the coupling portion and rotatably supported by the upper horizontal frame;
   a body portion having a first end connected to the first support portion and a second end coupled to the connecting gear; and
   a second support portion connected to the second end of the body portion and rotatably supported by the lower horizontal frame.

4. The display device according to claim 3, wherein the coupling portion comprises a coupling hole and the rotating opening/closing member comprises a coupling protrusion, the coupling protrusion of the rotating opening/closing member inserted into the coupling hole of the coupling portion, or
   the coupling portion comprises a coupling protrusion and the rotating opening/closing member comprises a coupling hole, the coupling protrusion of the coupling portion inserted into the coupling hole of the rotating opening/closing member.

5. The display device according to claim 3, wherein the upper horizontal frame comprises a first rotation support hole and the lower horizontal frame comprises a second rotation support hole, the first support portion inserted into the first rotation support hole and the second support portion inserted into the second rotation support hole.

6. The display device according to claim 3, wherein the body portion comprises a first connection hole at a first end of the body portion and a second connection hole at a second end of the body portion that is opposite the first end of the body portion, the first support portion inserted into the first connection hole at the first end of the body portion and the second support portion inserted into the second connection hole at the second end of the body portion.

7. The display device according to claim 2, wherein the upper horizontal frame and the lower horizontal frame comprise:
   a first frame connected to the side frame of the housing, the first frame comprising an opening hole disposed at one end of the first frame; and
   a second frame to which the connecting member is rotatably coupled, the second frame inserted into the opening hole of the first frame.

8. The display device according to claim 7, wherein the one end of the first frame is opened due to the opening hole, and stepped portions are on both sides of the opening hole.

9. The display device according to claim 8, wherein the second frame includes an insertion portion inserted into the opening hole and an extension portion extending to both sides of the insertion portion and connected to the stepped portions.

10. The display device according to claim 7, wherein the upper horizontal frame and the lower horizontal frame further comprise:
   a post member comprising end portions coupled to opposite positions of the first frame, the post member supporting the upper horizontal frame and the lower horizontal frame.

11. The display device according to claim 2, wherein the driving member further comprises a sensor assembly, the sensor assembly comprising:
   a first sensor coupled to the lower horizontal frame, the first sensor configured to sense a position of the sliding member; and
   a second sensor provided on the sliding member, a position of the second sensor configured to change relative to the first sensor as the sliding member slides.

12. The display device according to claim 11, wherein the display device further comprises a controller configured to control operation of the driving motor, and the controller is electrically connected to the driving motor and is configured to control the operation of the driving motor by comparing a signal value received from a remote controller or an opening/closing switch with a signal value received from the first sensor to control whether the driving motor operates and a rotation direction of the driving motor to control rotation of the rotating opening/closing member between the first position and the second position.

13. The display device according to claim 11, wherein the third gear comprises a plurality of gear portions that are spaced apart from each other on the side surface of the sliding member, and the second sensor is provided between a pair of gear portions from the plurality of gear portions.

14. The display device according to claim 13, wherein the second sensor is coupled to a coupling groove in the sliding member, the second sensor comprising an extension portion at an end of the second sensor extending in a direction of the first sensor.

15. The display device according to claim 2, wherein the driving member comprising: a first fixing member coupled to the sliding member, the first fixing member configured to slide together with the sliding member; a second fixing member coupled to a vertical frame that is perpendicular to the lower horizontal frame; and an elastic member between the first fixing member and the second fixing member, the elastic member connected to both the first fixing member and the second fixing member to elastically support the first fixing member and the second fixing member.

16. The display device according to claim 2, wherein the lower horizontal frame comprises a guide rail configured to guide the sliding of the sliding member, and the sliding member comprises a guide member configured to move along the guide rail.

17. The display device according to claim 3, wherein the display device further comprises an upper connecting member connected to the first end of the rotating opening/closing member, the upper connecting member comprising:
   an upper coupling portion coupled to the first end of the rotating opening/closing member;
   an upper support portion connected to the upper coupling portion and rotatably supported by the upper frame; and
   an upper connection gear coupled to the upper support portion, the upper connection gear configured to rotate responsive to rotation of the rotating opening/closing member.

18. The display device according to claim 17, wherein the display device further comprises an upper sliding member disposed on the upper frame, the upper sliding member coupled to the upper connection gear and configured to slide responsive to rotation of the upper connection gear.

19. The display device according to claim 17, further comprising:
   an upper rotation support member at an end of the upper support portion and fixed to an upper cover of the housing, the upper rotation support member supporting rotation of the upper support portion.

20. The display device according to claim 3, wherein the display device further comprises a lower housing disposed under the housing, and
   the lower housing comprises a lower opening/closing member configured to rotate between the first position to open a rear of the lower housing and a second position to close the rear of the lower housing, and the lower opening/closing member is rotatably coupled to a lower housing frame, the lower opening/closing member is rotated in conjunction with the rotating opening/closing member by the driving member.

* * * * *